(12) United States Patent
Maiman et al.

(10) Patent No.: US 12,266,197 B2
(45) Date of Patent: Apr. 1, 2025

(54) DETECTION OF MANUAL ENTRY ERROR

(71) Applicant: Capital One Services, LLC, McLean, VA (US)

(72) Inventors: Tyler Maiman, Melville, NY (US); Joshua Edwards, Philadelphia, PA (US); Feng Qiu, Newark, DE (US); Michael Mossoba, Great Falls, VA (US); Alexander Lin, Arlington, VA (US); Meredith L Critzer, Midlothian, VA (US); Guadalupe Bonilla, Hyattsville, MD (US); Vahid Khanagha, Rockville, MD (US); Mia Rodriguez, Broomfield, CO (US); Aysu Ezen Can, Cary, NC (US)

(73) Assignee: Capital One Services, LLC, McLean, VA (US)

( * ) Notice: Subject to any disclaimer, the term of this patent is extended or adjusted under 35 U.S.C. 154(b) by 303 days.

(21) Appl. No.: 17/731,936

(22) Filed: Apr. 28, 2022

(65) Prior Publication Data

US 2023/0351780 A1 Nov. 2, 2023

(51) Int. Cl.
*G06V 30/12* (2022.01)
*G06F 40/295* (2020.01)
*G06V 30/19* (2022.01)
*G10L 15/26* (2006.01)

(52) U.S. Cl.
CPC ............ *G06V 30/12* (2022.01); *G06F 40/295* (2020.01); *G06V 30/19013* (2022.01); *G10L 15/26* (2013.01)

(58) Field of Classification Search
USPC .......................................... 382/181
See application file for complete search history.

(56) References Cited

U.S. PATENT DOCUMENTS

| | | |
|---|---|---|
| 6,914,975 B2 | 7/2005 | Koehler et al. |
| 10,091,361 B1 | 10/2018 | Howard |
| 10,134,400 B2 | 11/2018 | Ziv et al. |
| 10,210,861 B1 | 2/2019 | Arel et al. |
| 2014/0278343 A1 | 9/2014 | Tran |
| 2016/0335244 A1 | 11/2016 | Weisman et al. |
| 2017/0293610 A1 | 10/2017 | Tran |
| 2017/0316777 A1 | 11/2017 | Perez et al. |
| 2018/0218374 A1 | 8/2018 | Shah et al. |
| 2019/0180175 A1* | 6/2019 | Meeter .................. G10L 15/26 |
| 2019/0253558 A1 | 8/2019 | Haukioja et al. |

(Continued)

*Primary Examiner* — Darryl V Dottin
(74) *Attorney, Agent, or Firm* — Foley & Lardner LLP

(57) ABSTRACT

Systems and computer-implemented methods disclosed herein relate to detecting errors in manually entered data. In one embodiment, the system can identify a named entity automatically from a conversation between a customer and service agent with a named entity recognition model that employs natural language processing and machine learning to detect a word or string of words in the conversation that corresponds to a named entity category. In another embodiment, the system can determine whether data entered into a field on a service platform by the service agent includes an error by comparing the data entered with the named entity. In another embodiment, the system can transmit an alert to the service agent through the service platform when there is a mismatch between the named entity and the data entered.

20 Claims, 7 Drawing Sheets

(56) References Cited

U.S. PATENT DOCUMENTS

| | | | |
|---|---|---|---|
| 2020/0175961 A1* | 6/2020 | Thomson | G10L 15/28 |
| 2021/0005178 A1* | 1/2021 | Moore | G10L 15/22 |
| 2021/0142789 A1 | 5/2021 | Gurbani et al. | |
| 2023/0085433 A1* | 3/2023 | Can | G10L 15/26 |
| | | | 704/235 |

* cited by examiner

DETECTION OF MANUAL ENTRY ERROR

BACKGROUND

While many companies have begun trying to move service customer service inquiries through websites and mobile applications, call centers remain in use. Call centers allow a customer to discuss inquiries with a call center agents (e.g., service agents) through a telephone call. During the conversation, the service agent may answer customers' questions. In some instances, service agents receive spoken information from the customer.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

The subject disclosure pertains to systems and computer-implemented methods relating to detection of manual entry error. In an embodiment, a system is provided. The system can comprise a processor coupled to a memory that includes instructions that, when executed by the processor, can cause the processor to identify a named entity from a conversation using a named entity recognition model that employs natural language processing and machine learning to detect at least one spoken word in the conversation that corresponds to a named entity category; determine whether data entered into a field on a service platform by a participant in the conversation includes an error by comparing the data entered with the named entity; and transmit an alert to the participant through the service platform when there is a mismatch between the named entity and the data entered.

According to another embodiment, a computer-implemented method is provided. The computer-implemented method can comprise executing, on a processor, instructions that cause the processor to perform operations associated with detecting errors in manually entered data. The operations can comprise recording a conversation between at least two parties: identifying a named entity from the recording via a named entity recognition model that employs natural language processing and machine learning to detect at least one spoken word in the recording that corresponds to a named entity category: determining whether data entered into a field on a service platform by a participant includes an error by comparing the data entered with the named entity; and transmitting an alert to the participant through the service platform when there is a mismatch between the named entity and the data entered.

In another embodiment, a computer-implemented method is provided. The computer-implemented method can comprise recording a conversation: generating a transcript of the conversation from the recording of the conversation via a speech-to-text converter: identifying one or more named entities from the transcript via a named entity recognition model that employs natural language processing and machine learning to detect at least one word in the transcript that corresponds to a named entity category: identifying data entered into a field on a service platform by a participant of the conversation that corresponds to the one or more named entities: comparing the data entered with the one or more named entities to identify an error; and transmitting an alert to the participant through the service platform when there is a mismatch between the data entered and the named entity.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Figure 1:
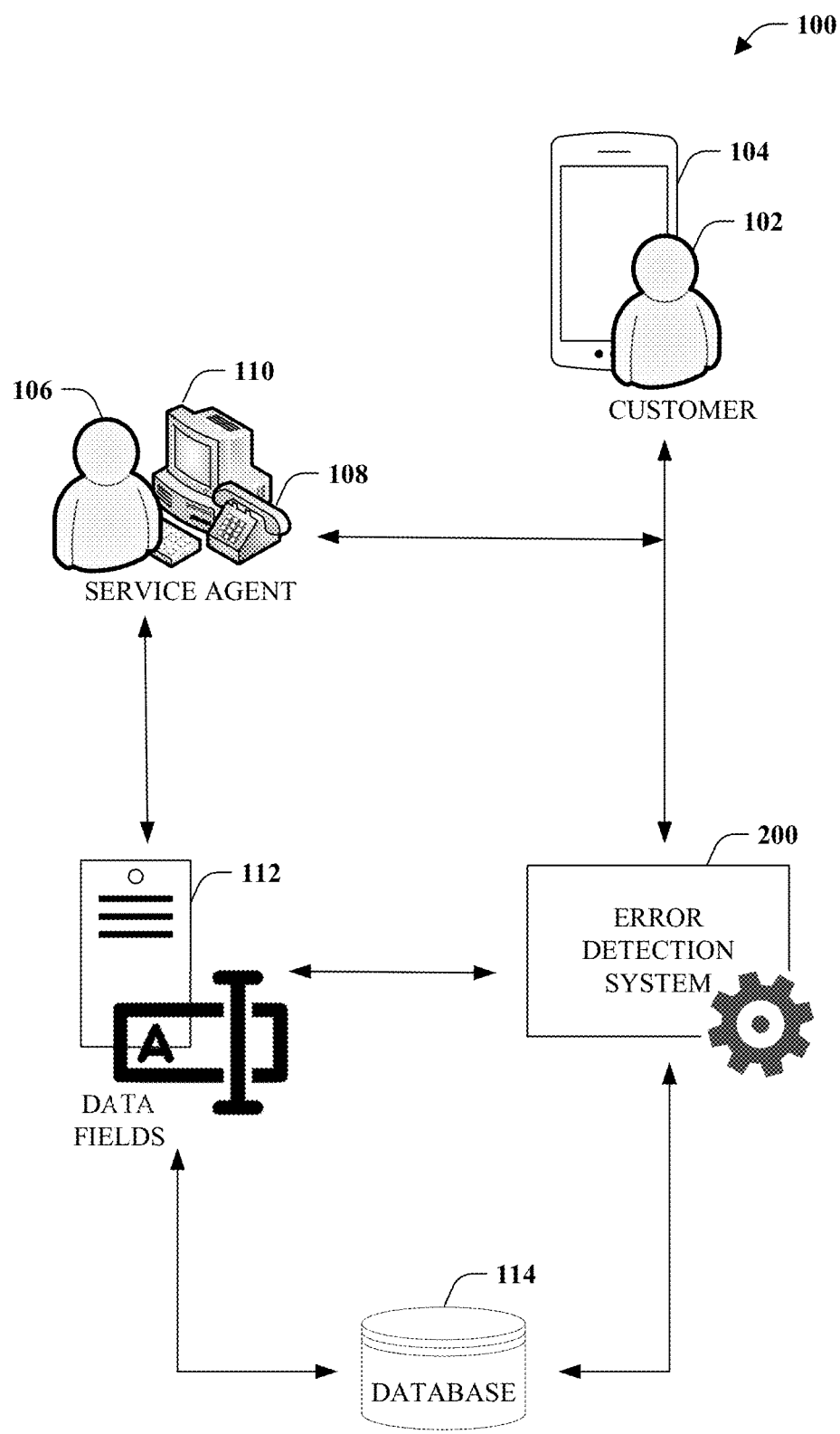
FIG. 1 illustrates an overview of an example implementation in accordance with one or more embodiments described herein.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

A servicing request may be as simple as a customer requesting to change their mailing address on their account. In this scenario, the call center agent goes to the appropriate section of the service platform, asks the customer for their new address, types that new address into the correct form field, and saves this address update. Even though this may seem like a simple task, it may be quite difficult when a customer is difficult to understand, and the call center agent is multitasking.

Data entry mistakes can cause significant impact down the line. For example, if contact information such as postal address, email address, or phone number is entered incorrectly, this can impact both the customer and the company. The mistake may be as simple as two digits being flipped, or a letter or number typed wrong. The impact may be significant if the method of communication is affected by this error. Customers may not be able to receive notifications that they should receive, such as a bill in the mail, servicing calls, or email reminders that payment is due, etc., which can lead to late payment and possibly additional fees or interests. This can escalate to the point of write-off or customers leaving companies and closing accounts because they are unhappy. Furthermore, this prevents companies from cross-selling additional services to customers, which limits the amount of money that companies can potentially make from those customer relationships. Another field that can have an impact is the name field. Errors in name fields can cause issues looking up the customers. Incorrect entry of a social security number can cause a customer requirement not to be met or reference to an anti-money laundering list not to be checked properly. The list of problems that can arise from data entry errors may be enormous.

The present disclosure generally relates to detecting errors in manually entered data. A service platform containing customer information that a service agent sees on a screen may be similar conceptually to a website a customer uses to sign up for a subscription. There may be an account button that has customer information such as name, address, password, subscription settings, payment information, etc. There may be different data fields (e.g., generally, fields) that are editable for the service agent to edit or enter the customer information. A service platform with separate data fields that are discreet and need data typed into may be distinct from a transcript or a running log. For example, if a customer's address is being updated, the address needs to be entered into an address data field. Data fields that are being edited or have been edited may be detected for a disconnect between the information entered and the information provided by the customer.

Conversations may be recorded and translated (e.g., transcribed) from audio to textual data, which may be cross-referenced with the manual entry a service agent entered into a service platform that is also a user interface (UI). Artificial intelligence (AI) can differentiate between voices and can select to record and translate just the customer's voice as the information is provided by the customer. The information provided in the transcript may be cross-referenced with the data entered into the data fields. Named entity recognition (NER), a form of natural language processing (NLP), is an AI technique that can extract (e.g., identify) key information in a text such as a transcript of a recorded conversation between a customer and a service agent. NER can automatically identify named entities in a text and classify (e.g., categorize) them into predefined categories. Examples of named entities may be but are not limited to the name of the customer, mailing address (e.g., postal address), email address, phone number, account number, etc. The named entities may be tagged according to predefined categories (e.g., tagged as name, mailing address, email address, phone number, account number, etc.) and compared with the relevant entities (e.g., data or information) in the data fields. For example, a mailing address extracted from the transcript may be tagged as a mailing address and compared with the mailing address entered into the mailing address data field. A mailing address extracted from the transcript may be compared with a similar mailing address, not a distinctly different mailing address, from the mailing address data field to detect manual entry error. This can prevent having to parse through an entire customer record.

If the information entered does not match with the translated information, disclosed embodiments may alert of the discrepancy (e.g., mismatch, error, typo) the service agent may be in one or more different ways. Disclosed embodiments may, for example, automatically correct the entered data to match the text generated from speech recognition. However, it may be more practical to have the service agent decide whether a correction is needed. For example, depending on the quality of the audio and/or speech recognition algorithm, there may be a lower likelihood that the service agent mishears than the speech-to-text recognition mishears. And in some cases, due to regulatory requirements, company policies, and/or public relations purposes, for example, it may be necessary for the text to be entered by a human. In such situations, it may be beneficial for the interpretation of the spoken information to be a human (e.g., the service agent). Depending on whether the customer is still on the phone with the service agent, the service agent can confirm the information in the data entry with the customer at that point. The embodiments herein can also be applied to in-person communications or communications between a customer and a chatbot as a service agent. However, for privacy concerns, customers may not want to share private information such as their social security number with a chatbot. If an error is detected after a call has ended, the customer may be called again. However, that would not be a good customer experience. As an alternative, disclosed embodiments may replay an audio recording of the call may beso the service agent can listen to the relevant part of the conversation again and cross-reference that with what was entered to confirm whether the data entered is correct. It is not uncommon for people to make mistakes typing, so having an audio recording of the conversation between participants such as the customer allows the service agent to listen again and correct the data entries if needed.

In a real-time situation, error detection may be performed on data fields that are currently being edited or had just been edited. For example, as the customer information is being entered, an error indication can appear as soon as the error begins or soon after the customer information is entered. Real-time may be described as within a predetermined amount of time that may be almost indistinguishable from the actual time. Cached elements (e.g., cached data fields), in a real-time situation, can track the data field that is being edited. The information in the cached data field may be matched (e.g., compared or analyzed) with the translated information provided by the customer.

In a near real-time situation, error detection may be performed on data fields that were already edited as there may be a problem with time lags based on the amount of time it takes for error detection to complete. The difference between real-time and near real-time may be that in a real-time situation, the service agent is entering information while speaking with the customer and has not yet left the screen, whereas, in near real-time, the service agent may have already left the screen. Near real-time may be described as within a predetermined amount of time that may be distinguishable from the actual time as presented by a lag in time (e.g., delay in receiving error detection results). Saved data entries may be compared with the cached data fields to identify which data fields were actually updated and cross-reference the updated data entries with the translated information provided by the customer. If the amount of lag is known, timestamps may be used to figure out which data fields have been edited. For example, if the near real-time has a 30-second lag, then cache the data fields that have been touched (e.g., interacted with, edited, modified, changed, etc.) within the last 30 seconds. As 30 seconds continue to elapse, the tracking of the data fields in the UI keeps dropping off and adding new data fields. At any given time, there may be a subset of data fields that have been edited within the last 30 seconds. Additionally, there may be a loading screen to prompt the service agent of a waiting period. For example, if the data entries are saved or submitted before it has been processed (e.g., detected for error), there may be a pop-up notification letting the service agent know that there is a wait period for error detection to complete. Ideally, the lag is no longer than 30 seconds. If the lag or wait period is 45 seconds, that may be considered too long of a wait for the service agent and the customer. Upon receiving a notification of a wait period, the service agent can inform the customer of the wait for error detection to process.

Error detected may be transmitted via alerts (e.g., notifications) to inform the service agent to verify the entered data with the customer before ending a call. An alert may be, but is not limited to, a beep or an auditory cue (e.g., a sound), a squiggly underline preferably of a color such as red, a highlight on the screen (e.g., service platform or UI), a pop-up on the screen, a flash on the screen, an alert icon, etc. Alerts may be considered insufficient without showing or explaining the error that has been detected and need to be accompanied by an indication of what seems to be the error.

Beeps and auditory cues would likely not live on their own but would be used to additionally alert the service agent. It may be considered insufficient to use a beep or an auditory cue without an indication of what appears to be the error. It is contemplated that an auditory cue may be a read-aloud explanation of what appears to be the error, in which case the auditory cue can live on its own without another indication of what the error appears to be. An indication of what seems to be the error may be a display or a read-aloud explanation that informs the service agent of the customer information that needs to be verified or confirmed. Squiggly underlines of the detected error may be accompanied by an explanation of what the error seems to be. For example, an explanation of the error can show up upon hovering over the squiggly underlines with a mouse cursor. The explanation may be a pop-up display showing the extracted customer information relevant to the data field with the squiggly underline. A highlight may be a changing font color such as red to highlight the texts. A highlight can also be a changing data field background color such as yellow: A highlight may be accompanied by an explanation of what the error seems to be, such as a display of an explanation upon hovering over the highlighted texts or the highlighted data field. A pop-up notification on the screen can explain the disconnect between the data entry and the translated customer information and display the translated customer information. A pop-up notification on the screen can require the service agent to actively dismiss (e.g., closeout) the pop-up notification, which can indicate that the customer information has been verified. A flash on the screen would require an indication of what appears to be the error. Similar to a beep or an auditory cue, it may be considered insufficient to use a flash without an indication of what appears to be the error. An alert icon can appear by the data field that has an error or disconnect to apprise the service agent of the need to verify the customer information. Similar to the other visual alerts (e.g., squiggly underline and highlight), additional alerts may be transmitted to accompany the alert icon. For example, in addition to the alert icon having a hovered-over feature that displays the reason for the disconnect, a pop-up notification or a read-aloud auditory cue can also be transmitted to accompany the alert icon. These alerts may be ways to inform the service agent of the disconnect detected in a real-time situation. In a near real-time situation, there may be a pop-up notification on a screen informing the service agent that there are possible errors detected, and the pop-up notification can have different buttons such as buttons to take the service agent to the screens or pages containing the disconnect, which can have alerts similar to the real-time situation, buttons to automatically queue up and play the part of the audio recording relevant to the disconnect, and buttons to take the service agent to the section in the transcript relevant to the disconnect.

In alternative to or in addition to transmitting alerts through the UI, a save button or submit button may be disabled until the disconnects are addressed. For example, confirmation or correction (e.g., generally, confirmation) of the data entered may be required prior to saving or submitting the data entries. If the data entries are automatically saved, confirmation may be required in order to submit the data entries.

Referring to FIG. 1, an overview of an example implementation 100 in accordance with one or more embodiments described herein is illustrated. Customer 102 can use mobile phone 104 to call service agent 106 on telephone 108, or the customer 102 can speak with the service agent 106 in person. The error detection system 200 can employ AI and NLP to record and translate the conversation between the customer 102 and the service agent 106 as participants of the conversation, and convert audio data to textual data (e.g. converting at least one spoken word to text). While speaking with the customer 102, the service agent 106 can use computer 110 to access a service platform containing customer information for the customer 102. The customer information may be displayed in editable data fields (e.g., data fields 112) containing customer information such as name, address, password, subscription settings, payment information, etc.

As the service agent 106 assist the customer 102 answer account information, the service agent 106 can ask the customer 102 to verify certain information and to provide updates if there have been any changes. If there are any information that need to be updated or added, the service agent can enter that information into the data fields 112 using the computer 110. Data entries saved in the data fields 112, as well as recorded and translated information from the error detection system 200, may be transmitted to database 114. The database 114 can save and make these data available to components of the error detection system 200. The database 114 may be local or remote to the components of the error detection system 200 and may be distributed across devices.

Figure 2:
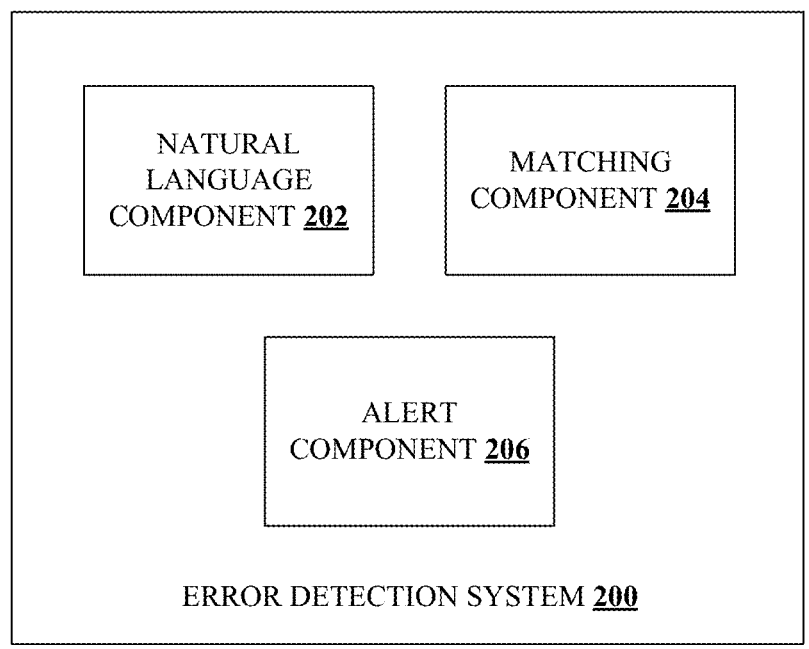
FIG. 2 illustrates a block diagram of an example, non-limiting error detection system in accordance with one or more embodiments described herein.

FIG. 2 illustrates a block diagram of an example, non-limiting error detection system 200 in accordance with one or more embodiments described herein. The error detection system 200 can comprise natural language component 202, matching component 204, and alert component 206. The natural language component 202 can employ AI and NLP to extract information from a conversation between customer 102 and service agent 106, such as recording and transcribing the conversation between the customer 102 and the service agent 106 or recording and transcribing the customer 102 without recording and transcribing the service agent. Furthermore, the natural language component 202 can also employ NER, a form of NLP, to detect and categorize named entities from the information provided by the customer 102 based on training datasets and historical data collected from a feedback loop.

More specifically, AI or machine learning (ML) may be utilized for automatic speech recognition (ASR) to process speech into text, e.g., speech-to-text recognition. Voice biometrics, e.g., voice characteristics, may be utilized by AI or ML to identify which voice belongs to the customer 102 and which voice belongs the service agent 106. Based on detection of the voice of the customer 102 using voice biometrics, the natural language component 202 can record and transcribe the entire conversation between the customer 102 and the service agent 106 or the natural language component 202 can record and transcribe the customer 102, without recording and transcribing the service agent 106. Using the transcribed information, the natural language component 202, utilizing NER, can detect named entities and tag them according to their predefined categories such as name, mailing address, email address, phone number, account number, etc. The named entities in the information provided by the customer 102 may be used by the matching component 204 to determine whether data entries entered into the data fields 112 by the service agent 106 contain an error or a disconnect. For example, the matching component 204 can analyze or match the data entries entered with the named entities from the information provided by the customer 102.

The data entries may be matched, by the matching component 204, with the named entities from the information provided by the customer 102 as the data entries are entered into the data fields 112. The matching component can also match the data entries within a predetermined amount of time upon entering or within a predetermined number of the data entries entered. The data entries can also be matched upon completion of all entries or data entries. The data entries can also be matched whether the data entries were entered or edited by the service agent 106 or previously entered from a different customer service session.

If the data entries do not match the named entities from the information provided by the customer 102, the alert component 206 can transmit alerts (e.g., notifications) to the service agent 106. For example, a service platform may be a user interface that can provide (e.g., display) the data fields 112 for entering the data entries, editing the data entries, or receiving the alerts upon detection of an error based on mismatch of the data entries with the named entities from the information provided by the customer 102. The service agent 106 can receive alerts comprising a pop-up notification on the service platform, underline highlights of the data entries that are mismatched, color highlights of the data entries that are mismatched, highlights of the data fields containing the data entries that are mismatch, an auditory cue, an auditory announcement, an information icon, or a flash. Details of the error may be provided in response to hovering over, upon clicking on the alerts, or the details may be provided in a pop-up notification. In addition, details of the error can also be provided as a read-aloud explanation. An alert, whether visual or audio, should be accompanied by an explanation of the disconnect or error detected. Additionally, as previously mentioned, alerts may be transmitted in real-time or in near real-time based on whether there is a lag (e.g., a delay) in detection of manual entry error. However, the error detection system 200 can also detect an error in past data entries (e.g., data entered from another time prior).

It is contemplated that the error detection system 200 may be used for in-person customer service and customer service over telephone or internet, and in some instances, the service agent 106 may be a chatbot. In addition, the service agent 106 may be a chatbot that responds via text messages or text-to-speech. However, for privacy reasons, certain private information may be withheld by the customer 102.

Figure 3:
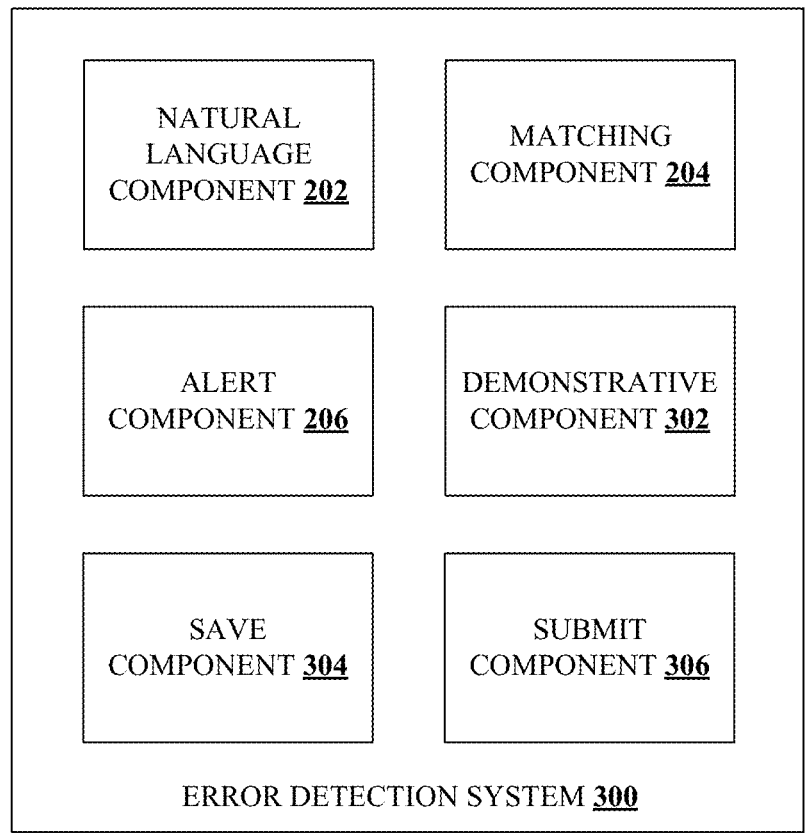
FIG. 3 illustrates a block diagram of another example, non-limiting error detection system in accordance with one or more embodiments described herein.

FIG. 3 illustrates a block diagram of another example, non-limiting error detection system 300 in accordance with one or more embodiments described herein. The error detection system 300 can further comprise demonstrative component 302, save component 304, and submit component 306. The demonstrative component 302 can direct the service agent to certain data fields within the data fields 112 that contain the error and to corresponding portion or parts of the audio recording or the transcript that contain the error. For example, the audio recording and the transcript, as recorded and transcribed by the natural language component 202, can have timestamps for identifying the part of the audio recording and transcript that contain the error. The demonstrative component 302 can provide the service agent 106 with this timestamp information. The demonstrative component 302 can also provide the service agent a direct link to the part of the audio recording or transcript that contain the error.

If correction or confirmation of the data entries are not addressed upon receiving alerts regarding the disconnect, the error detection system 300 can prevent the customer 102 from saving and submitting the data entries. For example, the save component 306 can save the data entries through a save button, and the submit component 308 can submit the data entries through a submit button. There can also be a save and continue button (e.g., one button for saving and continuing) as well as a save and submit one (e.g., one button for saving and submitting). The error detection system 300 can disable these buttons until a correction or a confirmation is made for the detected disconnect. To assist the service agent 106, an explanation of the error may be displayed upon hovering over or clicking on the submit button, the save button, or another example button. Upon clicking on the save button, the submit button, or another example button, the service agent may be notified of a waiting period for detection of the error prior to saving or submitting the data entries.

Figure 4:
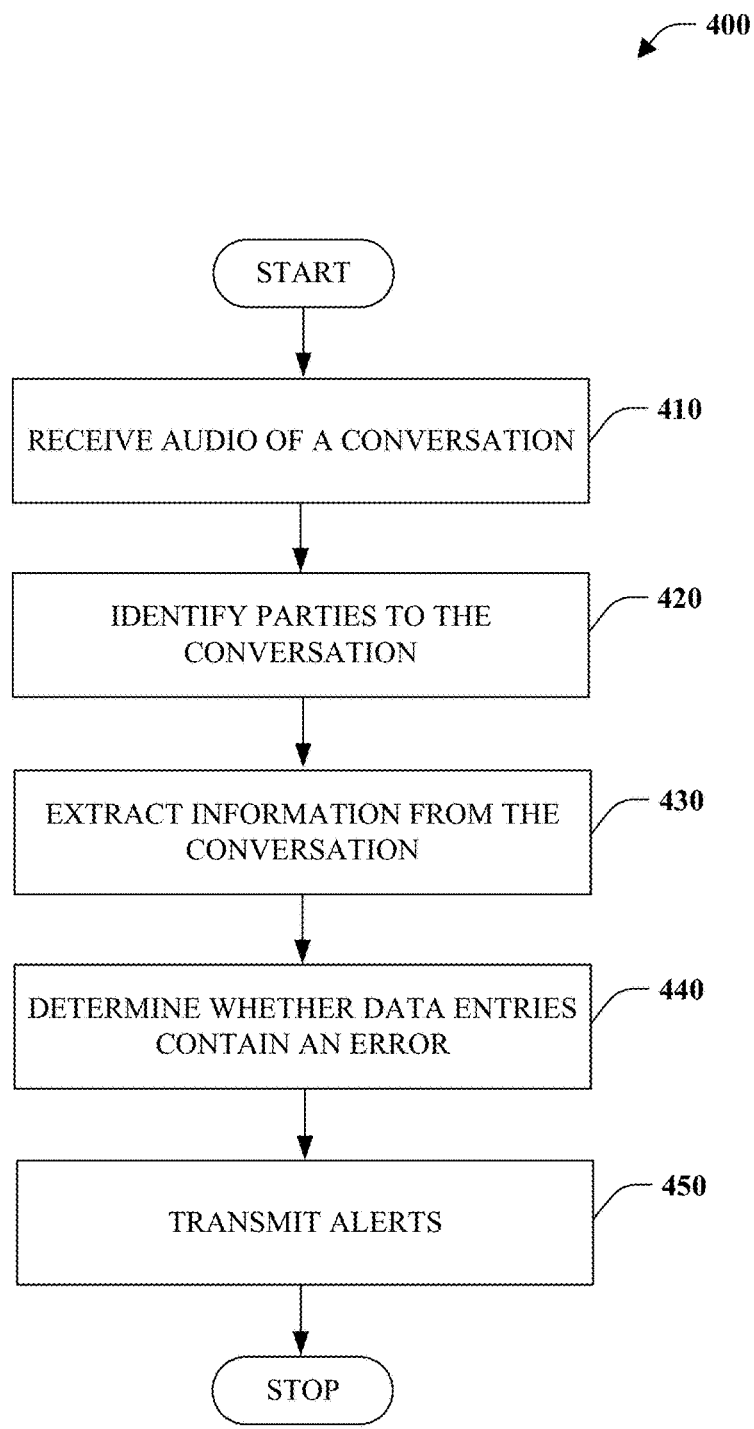
FIG. 4 illustrates a flow diagram of an example, non-limiting computer-implemented method in accordance with one or more embodiments described herein.
Figure 5:
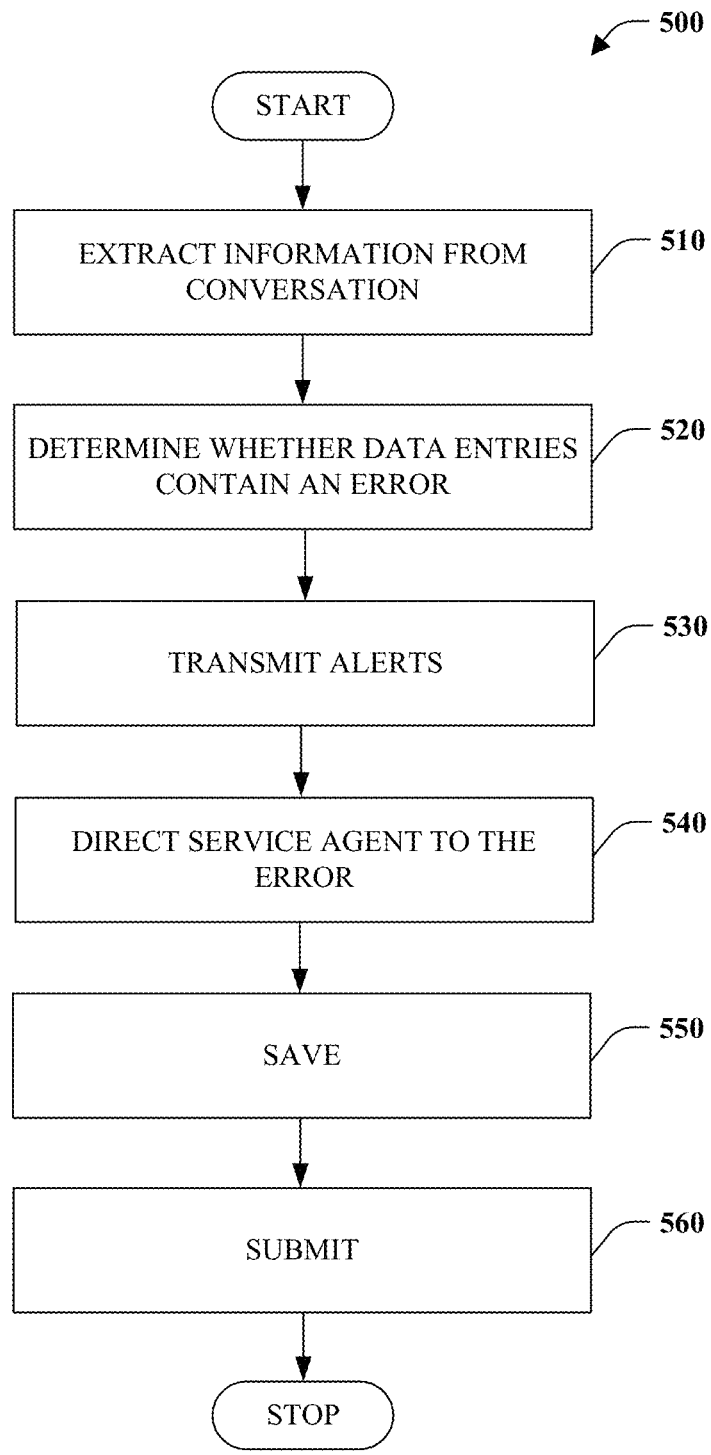
FIG. 5 illustrates another flow diagram of an example, non-limiting computer-implemented method in accordance with one or more embodiments described herein.
Figure 6:
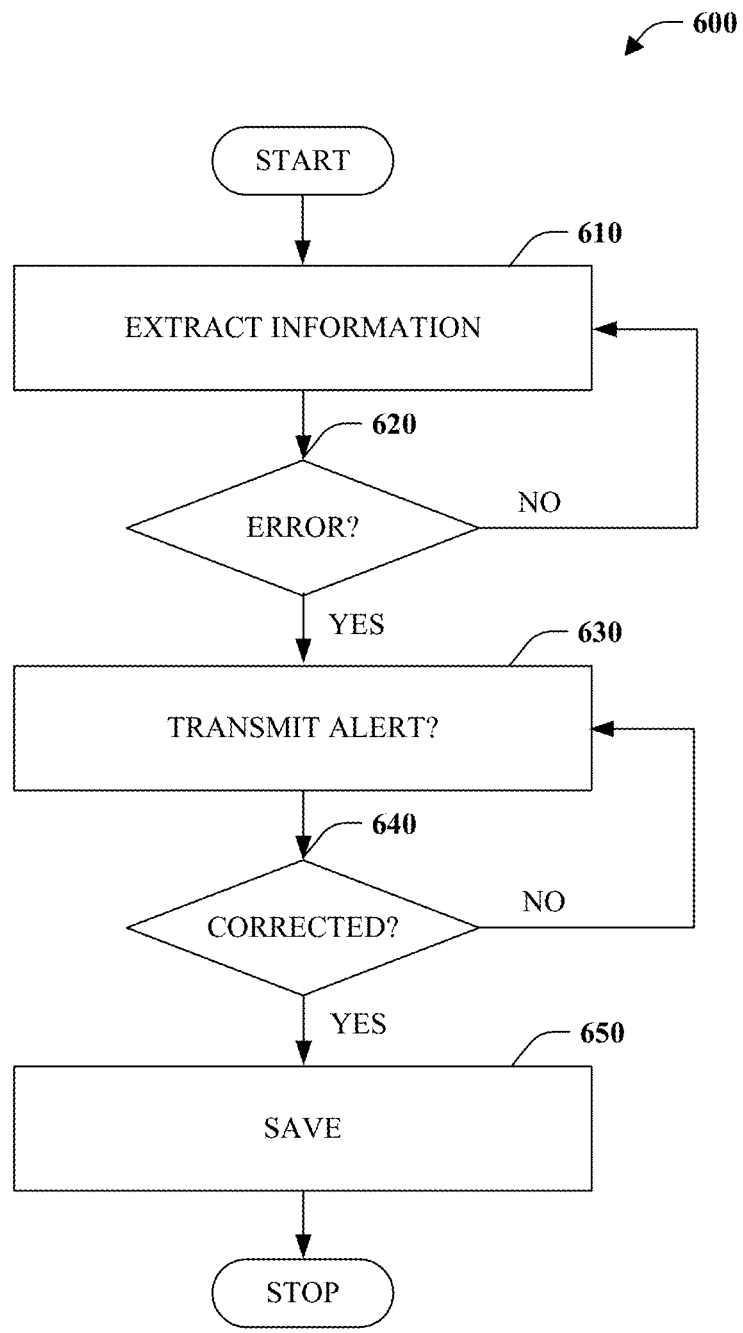
FIG. 6 illustrates another flow diagram of an example, non-limiting computer-implemented method in accordance with one or more embodiments described herein.

With reference to FIGS. 4 through 6, example, non-limiting computer-implemented methods 400, 500, and 600 are depicted. While, for purposes of simplicity of explanation, the methodologies shown herein, e.g., in the form of flow diagrams, are shown and described as a series of acts, it is to be understood and appreciated that the disclosed embodiments are not limited by the order of acts, as some acts may occur in a different order and/or concurrently with other acts from that shown and described herein. Moreover, disclosed embodiments may omit certain illustrated acts.

FIG. 4 illustrates a flow diagram of an example, non-limiting computer-implemented method 400 in accordance with one or more embodiments described herein. At step 410, the computer-implemented method 400 can comprise receiving, by the error detection system 200 operatively coupled to a processor (e.g., processor(s) 710), audio of a conversation. The audio may be of a conversation between two parties over a telephonic connection. For example, a customer may converse with a service agent over a customer service connection.

At step 420, the computer-implemented method 400 can comprise identifying, by the error detection system 200, the parties of the conversation. The error detection system 200 can determine identities of the parties by analyzing the audio of the conversation. For example, the error detection system 200 can determine identities of parties via voice biometrics and/or a matching analysis.

At step 430, the computer-implemented method 400 can comprise employing (e.g., via the natural language component 202), by the error detection system 200 operatively coupled to a processor (e.g., processor(s) 710), AI and NLP to extract information from a conversation between customer 102 and service agent 106, wherein NER is used to detect and categorize named entities from the information based on training datasets. The error detection system 200 may analyze the audio for named entities. For example, the error detection system 200 may determine an address was conveyed in the audio of the conversation by an identified customer to a service agent.

At step 440, the computer-implemented method 400 can comprise determining (e.g., via the matching component 204), by the error detection system 200, whether data entries entered into data fields 112 on a service platform by the service agent 106 contain an error by matching the data entries entered with the named entities from the information provided by the customer 102. The error detection system 200 may detect an error between a data entry and a named entity of the conversation. For example, the detection system 200 can determine a data entry input by the service agent as 124 State Road after determining the named entity as an address of 124 State Street. The detection system 200 can determine an error by detecting a difference between the two.

At step 450, the computer-implemented method 400 can comprise transmitting (e.g., via the alert component 206), by the error detection system 200, alerts to the service agent 106 if the data entries do not match the named entities from the information provided by the customer 102. The error detection system 200 can transmit an alert to the service agent. For example, the error detection system 200 can transmit an email and/or the like to the service agent to notify of the error.

FIG. 5 illustrates a flow diagram of another example, non-limiting computer-implemented method 500 in accordance with one or more embodiments described herein.

At step 510, the computer-implemented method 500 can comprise employing (e.g., via the natural language component 202), by the error detection system 200 operatively coupled to a processor (e.g., processor(s) 710), AI and NLP to extract information from a conversation between parties such as a customer 102 and a service agent 106, wherein NER is used to detect and categorize named entities from the information based on training datasets. The error detection system 200 may recognize named entities from the audio of the conversation. For example, the error detection system 200 may recognize a phone number that is spoken and/or conveyed during the conversation.

At step 520, the computer-implemented method 500 can comprise determining (e.g., via the matching component 204), by the error detection system 200, whether data entries entered into data fields 112 on a service platform by service agent 106 contain an error by matching the data entries entered with the named entities from the information provided by the customer 102. The error detection system 200 may monitor the data fields for the data entries to compare to named entities recognized from the conversation. For example, the error detection system 200 may monitor a phone number data field and detect a phone number entered into the data field. The error detection system 200 compares the two phone numbers.

At step 530, the computer-implemented method 500 can comprise transmitting (e.g., via the alert component 206), by the error detection system 200, alerts to the service agent 106 if the data entries do not match the named entities from the information provided by the customer 102. The error detection system 200 may transmit an alert, notification, and/or the like to the service agent and/or the customer if the named entity does not match the entry in the data field.

At step 540, the computer-implemented method 500 can comprise directing (e.g., via the demonstrative component 302), by the error detection system 200, the service agent 106 to the data fields 112 containing the error and to corresponding parts of the audio recording or the transcript containing the error. The error detection system 200 may highlight, visually alert, and/or the like the differences between the named entity and the entry in the data field. For example, the error detection system 200 may send a direct link to a transcript of the conversation to the service agent.

At step 550, the computer-implemented method 500 can comprise saving (e.g., via the save component 304), by the error detection system 200, the data entries through a save button. The error detection system 200 may automatically save the data entries and/or via a manual save.

At step 560, the computer-implemented method 500 can comprise submitting (e.g., via the submit component 306), by the error detection system 200, the data entries through a submit button. The error detection system 200 may provide the data entries to a system of the service agent and/or the like.

FIG. 6 illustrates a flow diagram of another example, non-limiting computer-implemented method 600 in accordance with one or more embodiments described herein.

At step 610, the computer-implemented method 600 can comprise employing (e.g., via the natural language component 202), by the error detection system 200 operatively coupled to a processor (e.g., processor(s) 710), AI and NLP to extract information from a conversation between customer 102 and service agent 106, wherein NER is used to detect and categorize named entities from the information based on training datasets. The error detection system 200 may recognize named entities from the audio of the conversation. For example, the error detection system 200 may recognize a first name that is spoken and/or conveyed during the conversation (e.g. "My first name is Tom" may be analyzed to determine a named entity of Tom as a first name data type or field).

At step 620, the computer-implemented method 600 can comprise determining (e.g., via the matching component 204), by the error detection system 200, whether data entries entered into data fields on a service platform by the service agent 106 contain an error by matching the data entries entered with the named entities from the information provided by the customer 102. The error detection system 200 detects an error when the named entity does not match a data entry into the data field that corresponds to the data type. For example, an error is detected if the named entity of Tom does not match a data entry that is entered as Tim.

If it is determined that there is an error, at step 630, the computer-implemented method 500 can comprise transmitting (e.g., via the alert component 206), by the error detection system 200, alerts to the service agent if the data entries do not match the named entities from the information provided by the customer 102. The error detection system 200 alerts the service agent on detecting the error (e.g. a mismatch between the named entity and the data entry.

At step 640, the computer-implemented method 600 can comprise determining (e.g., via the matching component 204), by the error detection system 200, whether data entries entered into data fields on a service platform by the service agent 106 contain an error by matching the data entries entered with the named entities from the information provided by the customer 102. The error detection system 200 may further monitor the data fields for a correction of the error by, for example, determining whether data entry matches the named entity after transmitting the alert.

If the service agent 106 corrected the error or dismissed the alert (e.g., confirmed the data entry) because the mismatch is not an error, then at step 650, the computer-implemented method 600 can comprise saving (e.g., via the save component 304), by the error detection system 200, the data entries through a save button. It is contemplated that the error detection system 200 can automatically save a data entry after it has been corrected by the service agent 106 or confirmed by the service agent 106 that there is no error.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer may be a component. One or more components may reside within a process and/or thread of execution, and a component may be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference may be employed to identify a context or an action or may be used to generate a probability distribution over states, for example. An inference may be probabilistic. For example, computation of a probability distribution over states of interest may be based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
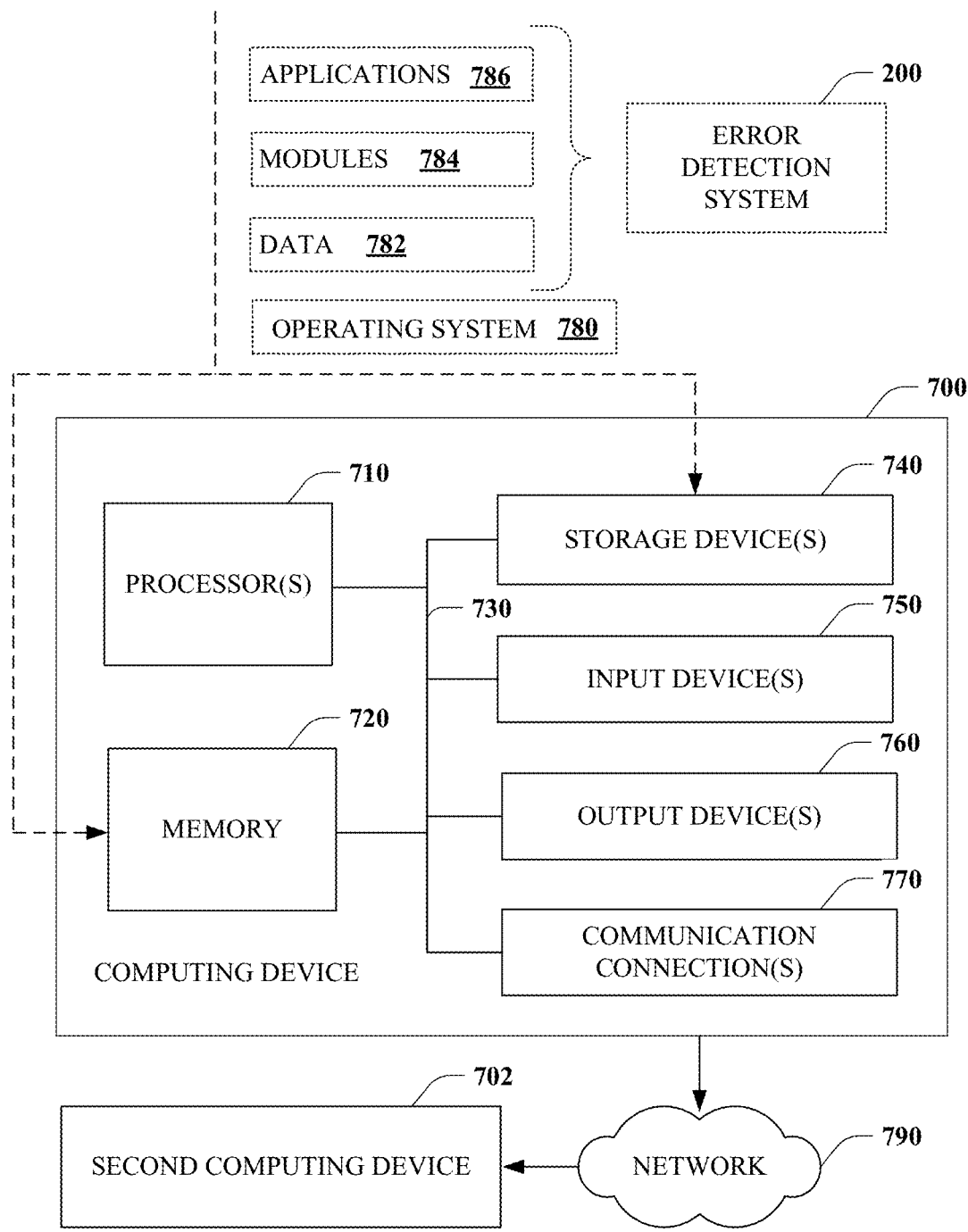
FIG. 7 is a block diagram illustrating a suitable operating environment for aspects of the subject disclosure.

To provide a context for the disclosed subject matter, FIG. 7, as well as the following discussion, are intended to provide a brief, general description of a suitable environment in which various aspects of the disclosed subject matter may be implemented. However, the suitable environment is solely an example and is not intended to suggest any limitation on scope of use or functionality.

While the above-disclosed system and methods may be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods may be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter may be practiced on stand-alone computers. In a distributed computing environment, program modules may be located in one or both of local and remote memory devices.

With reference to FIG. 7, illustrated is an example computing device 700 (e.g., desktop, laptop, tablet, watch, server, hand-held, programmable consumer or industrial electronics, set-top box, game system, compute node). The computing device 700 includes one or more processor(s) 710, memory 720, system bus 730, storage device(s) 740, input device(s) 750, output device(s) 760, and communications connection(s) 770. The system bus 730 communicatively couples at least the above system constituents. However, the computing device 700, in its simplest form, can include one or more processors 710 coupled to memory 720, wherein the one or more processors 710 execute various computer-executable actions, instructions, and or components stored in the memory 720.

The processor(s) 710 may be implemented with a general-purpose processor, a digital signal processor (DSP), an application-specific integrated circuit (ASIC), a field-programmable gate array (FPGA) or other programmable logic, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 710 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 710 may be a graphics processor unit (GPU) that performs calculations concerning digital image processing and computer graphics.

The computing device 700 can include or otherwise interact with a variety of computer-readable media to facilitate control of the computing device to implement one or more aspects of the disclosed subject matter. The computer-readable media may be any available media accessible to the computing device 700 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD)), and solid-state devices (e.g., solid-state drive (SSD), flash memory drive (e.g., card, stick, key drive)), or any other like mediums that store, as opposed to transmit or communicate, the desired information accessible by the computing device 700. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 720 and storage device(s) 740 are examples of computer-readable storage media. Depending on the configuration and type of computing device, the memory 720 may be volatile (e.g., random access memory (RAM)), non-volatile (e.g., read only memory (ROM), flash memory), or some combination of the two. By way of example, the basic input/output system (BIOS), including basic routines to transfer information between elements within the computing device 700, such as during start-up, may be stored in non-volatile memory, while volatile memory can act as external cache memory to facilitate processing by the processor(s) 710, among other things.

The storage device(s) 740 include removable/non-removable, volatile/non-volatile storage media for storage of vast amounts of data relative to the memory 720. For example, storage device(s) 740 include, but are not limited to, one or more devices such as a magnetic or optical disk drive, floppy disk drive, flash memory, solid-state drive, or memory stick.

Memory 720 and storage device(s) 740 can include, or have stored therein, operating system 780, one or more applications 786, one or more program modules 784, and data 782. The operating system 780 acts to control and allocate resources of the computing device 700. Applications 786 include one or both of system and application software and can exploit management of resources by the operating system 780 through program modules 784 and data 782 stored in the memory 720 and/or storage device(s) 740 to perform one or more actions. Accordingly, applications 786 can turn a general-purpose computer 700 into a specialized machine in accordance with the logic provided thereby.

All or portions of the disclosed subject matter may be implemented using standard programming and/or engineering techniques to produce software, firmware, hardware, or any combination thereof to control the computing device 700 to realize the disclosed functionality. By way of example and not limitation, all or portions of the error detection system 200 may be, or form part of, the application 786, and include one or more modules 784 and data 782 stored in memory and/or storage device(s) 740 whose functionality may be realized when executed by one or more processor(s) 710.

In accordance with one particular embodiment, the processor(s) 710 can correspond to a system on a chip (SOC) or like architecture including, or in other words integrating, both hardware and software on a single integrated circuit substrate. Here, the processor(s) 710 can include one or more processors as well as memory at least similar to the processor(s) 710 and memory 720, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the error detection system 200 and/or functionality associated therewith may be embedded within hardware in a SOC architecture.

The input device(s) 750 and output device(s) 760 may be communicatively coupled to the computing device 700. By way of example, the input device(s) 750 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 760, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 750 and output device(s) 760 may be connected to the computing device 700 by way of wired connection (e.g., bus), wireless connection (e.g., Wi-Fi, Bluetooth), or a combination thereof.

The computing device 700 can also include communication connection(s) 770 to enable communication with at least a second computing device 702 utilizing a network 790. The communication connection(s) 770 can include wired or wireless communication mechanisms to support network communication. The network 790 can correspond to a local area network (LAN) or a wide area network (WAN) such as the Internet. The second computing device 702 may be another processor-based device with which the computing device 700 can interact.

In one instance, the computing device 700 can execute an error detection system 200 for a first function, and the second computing device 702 can execute an error detection system 200 for a second function in a distributed processing environment. Further, the second computing device can provide a network-accessible service that stores source code, and encryption keys, among other things that may be employed by the error detection system 200 executing on the computing device 700.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. An error detection system, comprising:
   a processor coupled to a memory that includes instructions that, when executed by the processor, cause the processor to:
   identify, during a live conversation between a first user and a second user, a named entity from the live conversation using a named entity recognition model that employs natural language processing and machine learning to detect at least one spoken word in the live conversation that corresponds to a named entity category;
   determine, during the live conversation, whether data entered into a field on a service platform by the first user during the live conversation includes an error by comparing the data entered with the named entity; and transmit an alert to the first user through the service platform when the comparison indicates a mismatch between the named entity and the data entered.

2. The system of claim 1, wherein the service platform comprises a user interface that provides data fields for entering the data, editing the data, and receiving the alert.

3. The system of claim 1, wherein the alert comprises at least one of a pop-up notification, an underline of the data, a color highlight of the data, an auditory cue, an auditory announcement, an information icon, or a flash.

4. The system of claim 1, wherein details regarding the alert are provided in response to hovering over or clicking on the alert.

5. The system of claim 1, wherein the data was entered within a predetermined time after the at least one spoken word that corresponds to the named entity appeared in the live conversation.

6. The system of claim 1, wherein the instructions further cause the processor to record and transcribe the live conversation.

7. The system of claim 6, wherein the instructions further cause the processor to direct the first user to the field including the error and a corresponding part of a recording or transcript including the error.

8. The system of claim 1, wherein the instructions further cause the processor to:
save the data through a save button; and submit the data through a submit button.

9. The system of claim 8, wherein the instructions further cause an explanation of the error to be displayed based on hovering over or clicking on the save button or the submit button, and wherein the data cannot be saved or submitted until the error is addressed.

10. The system of claim 8, wherein upon clicking on the submit button or the save button, the first user is notified of a waiting period to detect the error prior to saving or submitting the data.

11. The system of claim 1, wherein the instructions further cause the processor to: identify a speaker during the live conversation; generate a transcript of a portion of the live conversation when the speaker is a customer; and identify the named entity from the transcript.

12. The system of claim 1, wherein the first user is a chatbot.

13. A computer-implemented method, comprising:
executing, on a processor, instructions that cause the processor to perform operations associated with detecting errors in manually entered data, the operations comprising:
recording a real-time conversation between at a first user and a second user;
identifying, during the real-time conversation, a named entity from the real-time conversation recording via a named entity recognition model to detect at least one spoken word in the real-time conversation recording that corresponds to a named entity category;
determining whether data entered into a field on a service platform by the first user during the real-time conversation includes an error by comparing the data entered with the named entity; and
transmitting an alert to the first user during the real-time conversation through the service platform when there is a mismatch between the named entity and the data entered.

14. The computer-implemented method of claim 13, wherein the operations further comprise identifying the data entered within a predetermined time after the word or string of words appear in the real-time conversation.

15. The computer-implemented method of claim 13, wherein the operations further comprise directing the first user to the field including the error and a corresponding portion of the real-time conversation recording associated with the error.

16. The computer-implemented method of claim 13, wherein the operations further comprise:
identifying speakers in the recording of the real-time conversation;
generating a transcript of a portion of the real-time conversation when a customer is the speaker; and
identifying the named entity from the transcript.

17. One or more non-transitory computer-readable media comprising instructions that, when executed by one or more processors, cause operations comprising:
generating, during a live conversation, a transcript of the live conversation from a live recording of the live conversation between a first user and a second user via a speech-to-text converter;
identifying, during the live conversation, one or more named entities from the transcript via a named entity recognition model that employs natural language processing and machine learning to detect at least one word in the transcript that corresponds to a named entity category;
identifying data entered into a field on a service platform by the first user during the live conversation that corresponds to the one or more named entities; and
transmitting an alert to the first user through the service platform when there is a mismatch between the data entered and the one or more named entities.

18. The non-transitory computer-readable media of claim 17, wherein transmitting an alert causes the service platform to at least one of generate a pop-up notification, underline the data entered, color highlight the data entered, play an auditory cue, or display an information icon.

19. The non-transitory computer-readable media of claim 17, wherein the instructions, when executed by the one or more processors, further cause operations comprising directing the first user to a data field associated with the mismatch and a corresponding portion of the live recording or the transcript associated with the field.

20. The non-transitory computer-readable media of claim 17, wherein the instructions, when executed by the one or more processors, further cause operations comprising:
identifying speakers in the recording of the live conversation; and
generating the transcript including a portion of the live conversation when a customer is the speaker.

* * * * *